(12) United States Patent
Bedoe et al.

(10) Patent No.: US 8,316,520 B2
(45) Date of Patent: Nov. 27, 2012

(54) SYSTEM OF FORMING A PROTECTIVE COVERING FOR A WIRE HARNESS

(75) Inventors: Scott Bedoe, McHenry, IL (US); Frederick Allan Buck, New Albany, OH (US)

(73) Assignee: CVG Management Corporation, New Albany, OH (US)

( * ) Notice: Subject to any disclaimer, the term of this patent is extended or adjusted under 35 U.S.C. 154(b) by 0 days.

(21) Appl. No.: 13/022,198

(22) Filed: Feb. 7, 2011

(65) Prior Publication Data

US 2011/0119882 A1    May 26, 2011

Related U.S. Application Data

(63) Continuation of application No. 12/055,070, filed on Mar. 25, 2008, now Pat. No. 7,908,742.

(51) Int. Cl.
*H01R 43/00* (2006.01)

(52) U.S. Cl. .............. 29/33 M; 29/825; 29/827; 29/746; 29/747; 29/748

(58) Field of Classification Search ............... 29/33 M, 29/746, 747, 748, 825, 827, 837, 842; 174/72 A, 174/77 R, 110 F; 439/736, 722, 404–409, 439/395; 296/211, 214
See application file for complete search history.

(56) References Cited

U.S. PATENT DOCUMENTS

| | | | |
|---|---|---|---|
| 3,194,279 A | 7/1965 | Brown | |
| 3,653,411 A | 4/1972 | Mosher et al. | |
| 4,483,373 A | 11/1984 | Tarbox | |
| 4,524,104 A | 6/1985 | Hagio et al. | |
| 5,312,868 A | 5/1994 | Abe et al. | |
| 5,331,115 A | 7/1994 | Ysbrand | |
| 5,421,747 A * | 6/1995 | Agnihotri et al. | 439/736 |
| 5,596,175 A | 1/1997 | Ysbrand | |
| 5,709,511 A | 1/1998 | Esmailzadeh | |
| 5,735,041 A | 4/1998 | Zaguskin et al. | |
| 5,739,463 A | 4/1998 | Diaz et al. | |
| 5,878,788 A | 3/1999 | Gurry | |
| 6,069,319 A * | 5/2000 | Davis et al. | 174/72 A |
| 6,086,037 A | 7/2000 | Nagy et al. | |
| 6,120,090 A * | 9/2000 | Van Ert et al. | 296/211 |
| 6,253,798 B1 | 7/2001 | Helwig | |
| 6,291,770 B1 | 9/2001 | Casperson | |
| 6,656,396 B2 | 12/2003 | Reichinger | |
| 6,852,021 B1 | 2/2005 | Ali et al. | |
| 6,919,511 B2 * | 7/2005 | Tsunoda et al. | 174/72 A |
| 7,572,404 B2 | 8/2009 | Nishikawa et al. | |

* cited by examiner

*Primary Examiner* — Derris Banks
*Assistant Examiner* — Tai Nguyen
(74) *Attorney, Agent, or Firm* — Kegler Brown Hill & Ritter; James J. Pingor

(57) ABSTRACT

A motion-powered liquid sprayer that can increase the number of rotations of the pump relative to each rotation of the wheel or axle is provided. The sprayer can include a gearing assembly that employs gears to increase the number of pump revolutions as a function of the wheel or axle rotation. The sprayer can also include a gear pump that employs an overcapacity or enhanced gullet together with blow-by spacing to control consistent liquid flow relative to variable motional velocities. Further, the sprayer can include a vertically adjustable nozzle as well as a free reverse rotation wheel hub.

18 Claims, 13 Drawing Sheets

# SYSTEM OF FORMING A PROTECTIVE COVERING FOR A WIRE HARNESS

CROSS-REFERENCE TO RELATED APPLICATIONS

This application is a Continuation of pending U.S. patent application Ser. No. 12/055,070 entitled "SYSTEM AND METHOD OF FORMING A PROTECTIVE COVERING FOR A WIRE HARNESS" and filed Mar. 25, 2008. The entirety of the above-noted application is incorporated by reference herein.

FIELD OF INVENTION

This invention relates to a system and method for forming a protective covering for a wire harness, and more particularly, to a system and method for forming a protective covering on a wire harness for use in interconnecting electrical systems.

BACKGROUND

The electrical systems of vehicles, such as automobiles and commercial vehicles, are intricate and continue to develop as manufacturers seek to provide more and more electrical capabilities to consumers. Early models of such vehicles had relatively few electrical systems, and many of these systems were relatively simple by today's standards. In contrast, modern electrical systems often involve numerous and complex subsystems, requiring substantial use of conductors and electronic devices for interconnecting components of the electrical systems.

As the demands on electrical systems have proliferated, manufacturers have sought to control the space occupied by conductors used in the electrical systems by bundling these conductors together into harnesses. A number of different types of protective coverings have been used, from relatively simple harness coverings, such as engineered tape, woven threading, nylon braiding, asphaltic loom material etc., used to bundle conductors together, to more complicated harness coverings, such as extruded plastic and metal sleeving/conduits. Overmolded polymers (in which a polymer is molded to wholly or partially encase the wire harness) are especially desirable for use as harness coverings because they provide advantages that are not available from the use of other types of harness coverings. For example, in addition to controlling and managing the routing of numerous conductors, overmolded polymers provide protection from damage to the bundled conductors that might otherwise result from salt corrosion, heat, vibration, water, and ultraviolet radiation.

These overmolded polymers must be shaped in accordance with a predetermined three-dimensional geometry, in order to fit properly in a vehicle. In the automotive and commercial vehicle industries, the overmolded polymer acts as a structural template for routing conductors and electronic devices through the desired parts of the vehicle. Spacing and volume considerations and potential paths between electrical subsystems are taken into account in determining the desired three-dimensional geometry for the harness coverings.

In order to create these overmolded harness coverings in a cost-effective manner, these coverings are often formed pursuant to injection molding. The mold generally includes two halves, i.e., a bottom half and a top half, defining a cavity therebetween that corresponds to a desired shape, and therefore, the exact configuration of the mold is important. One conventional injection molding technique is reaction injection molding (RIM). In accordance with this technique, two liquid components, generally a polyol and an isocyanate, are injected under pressure into the mold corresponding to the predetermined three-dimensional geometry of the harness covering. The liquids chemically react in the mold, i.e., the molecules of the components cross-link, to form a solid thermoset polymer, generally polyurethane.

The molds used in injection molding are often relatively expensive to manufacture. Generally, they are used to mass produce a high volume of identical parts and are less economical in low volume situations. Many molds are made of steel or aluminum to ensure a relatively long mold lifespan, but these materials may be relatively expensive and add to the cost of injection molding. Further, in the case of commercial vehicles, molds must be relatively large for the formation of large harnesses, which again adds to the cost of injection molding.

In addition, complex geometries often involve the use of molds having complex shapes, which further adds to the cost of molding. A three-dimensional mold is very expensive, and to create the three-dimensional geometries needed for the final harness covering shape, the mold becomes very complicated and costly to construct. Typically, the use of "actions," such as inserts or slides, in the mold allows a complex shape to be molded and, after molding, for the mold halves to be separated. The use of "actions: generally increase the fabrication cost of a harness covering by increasing the amount and complexity of the mechanisms that need to be placed in the mold and by increasing the molding time.

After the two liquids are injected and mixed, the resulting mixture cures over time to form a strong protective covering that is relatively strong and lightweight. Generally, the covering cures sufficiently such that within a few minutes the harness can be removed from the mold, i.e., demolded, and handled without damage. The covering continues to cure over the next few hours and becomes increasingly rigid and solid. After curing is completed, the harness with covering is a rigid and geometrically stable structure.

A need exists for a less expensive system and method for forming a harness having a predetermined three-dimensional geometry. There is also a need for a system and method for forming a harness covering that does not require the use of a separate three-dimensional mold for each desired three-dimensional geometry and that avoids the need for expensive molds to form complex geometries. Further, there is a need for an economical system and method for forming large harness covering having a desired geometry through reaction injection molding for use in commercial vehicles.

DESCRIPTION OF THE PREFERRED EMBODIMENT

Preferred embodiments of the system and method of the present invention are shown generally in FIGS. 1-8. As discussed further below, the system and method make use of a mold 10 and post-molding fixture 12. In a first phase, the mold 10 is used during an injection molding process, preferably a reaction injection molding process, to form a substantially flat harness 14 with covering 33 and having an intermediate, almost two-dimensional shape. In a second phase, the post-molding fixture 12 is used after the injection molding process to orient the harness 14 with covering 33 to a predetermined three-dimensional geometry corresponding to the desire final shape.

Figure 1:
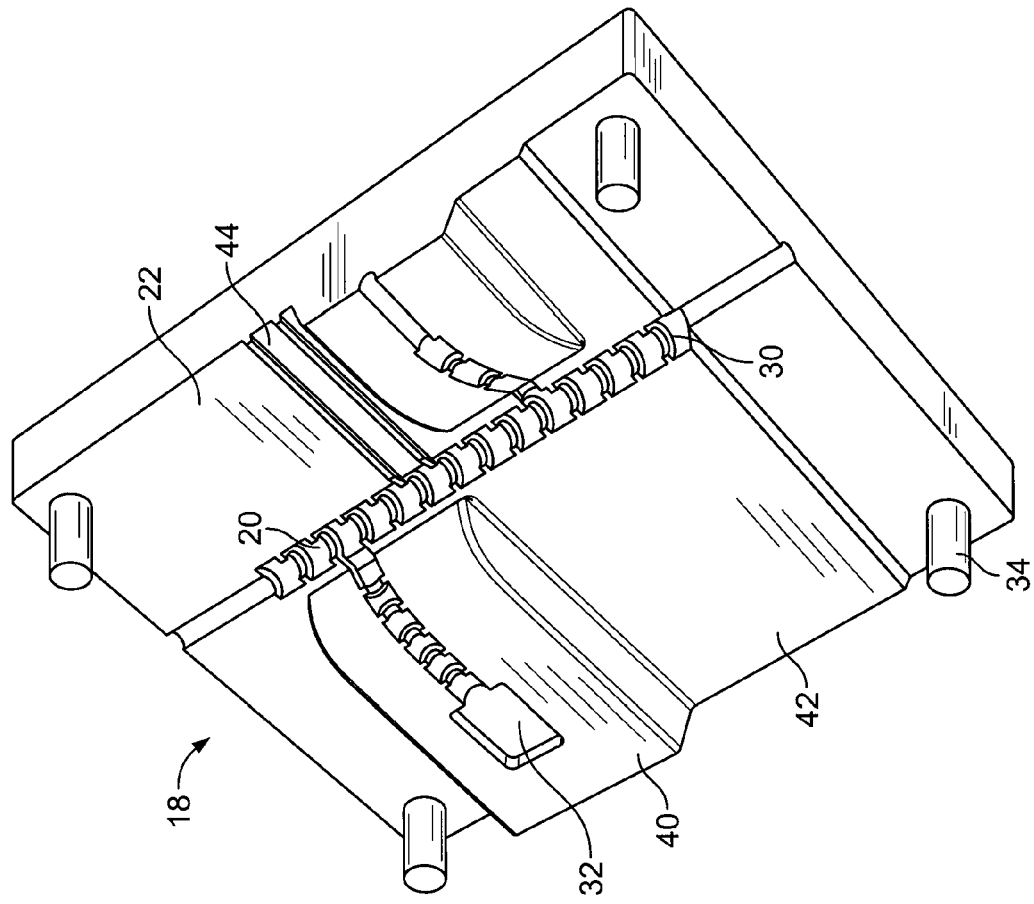
FIG. 1 is a perspective view of a wire harness and a bottom half of a mold embodying features of the present invention.
Figure 1:
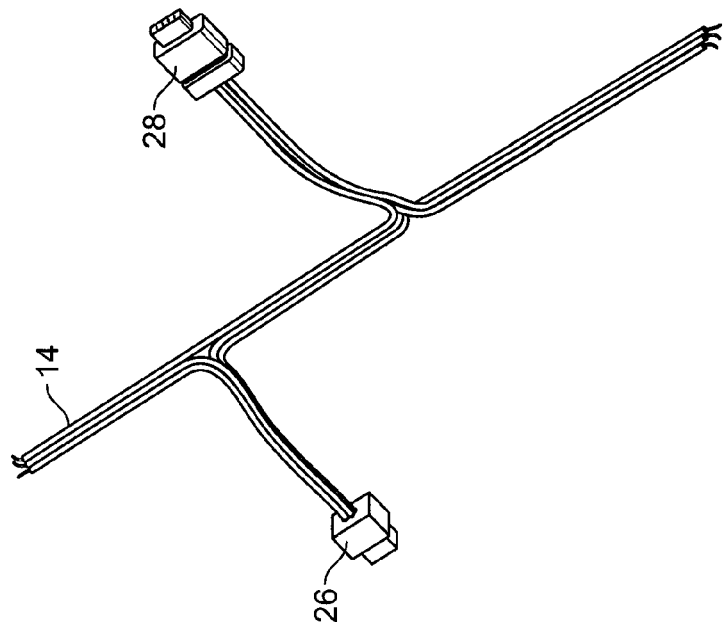
Figure 2:
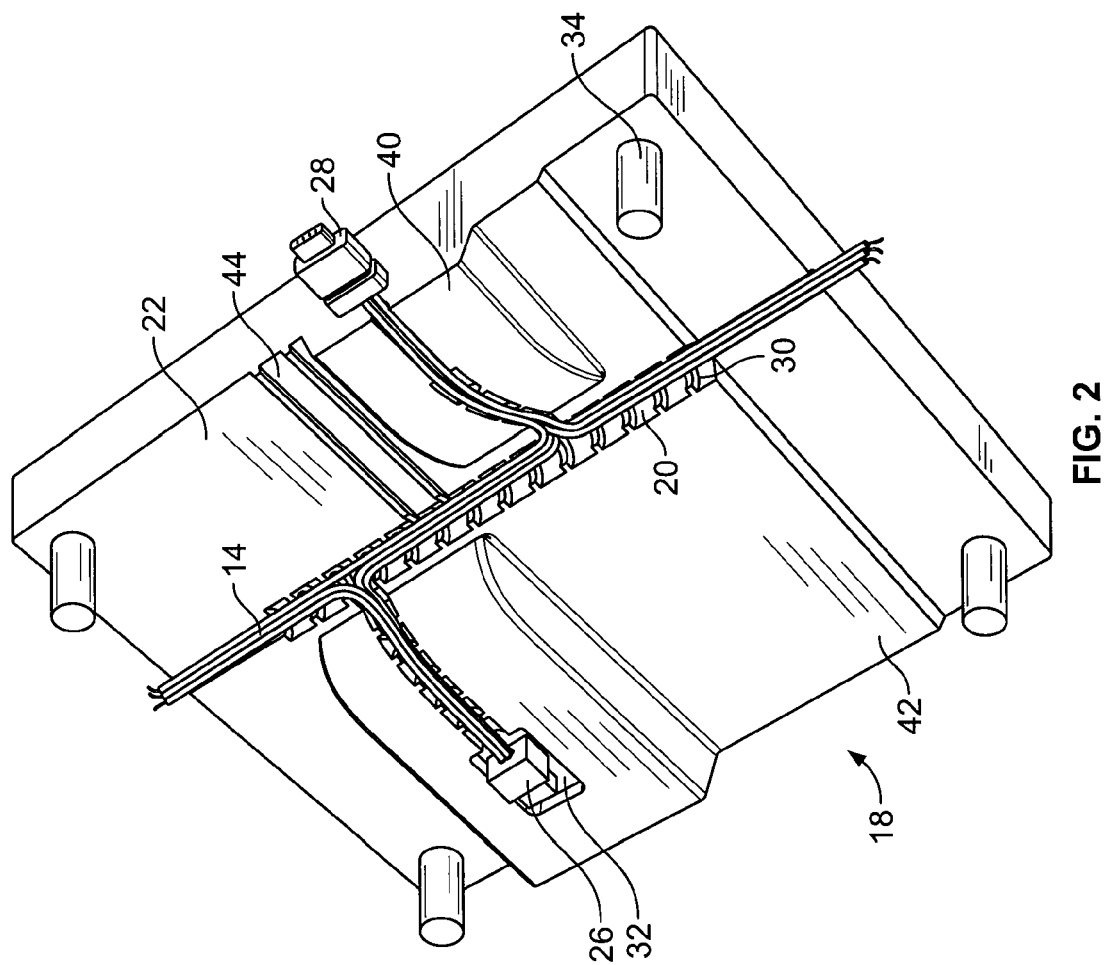
FIG. 2 is a perspective view of the wire harness disposed in the bottom half of the mold of FIG. 1.

The first phase involves injection molding to form a substantially flat and temporary geometry. A mold 10 used in a preferred embodiment can be seen in FIGS. 1-3. As can be seen in FIGS. 1 and 2, a bottom half 18 of the mold 10 is substantially rectangular in cross-section and includes a cavity portion 20 formed in its interior surface 22. The harness 14 interconnects a first electronic connector 26 for connection to a first electrical system and a second electronic connector 28 for connection to a second electrical system. The cavity 20 preferably includes a plurality of sub-cavities 30 that correspond generally to the shape of the harness 14 and that are filled when the reaction injection molding process is initiated to form a covering 33. One or more of the sub-cavities 30 may also correspond to the shape of an electronic connector or other device, such as the substantially rectangular sub-cavity 32 shown in FIGS. 1 and 2 corresponding generally to the shape of the first electronic connector 26.

The mold 10 used in the preferred embodiment makes use of sub-cavities 30 in order to form a covering 33 that is corrugated. It has been found that these subcavities 30 are effective in centering the wire harness 14 in the mold 10 such that the injection molding liquid can envelop the harness 14. Without the sub-cavities 30, the wire harness 14 may settle in the bottom of the cavity 20 such that the bottom of the harness 14 is not properly encased during the injection molding process. Alternatively, for molds having a cavity 20 with a curvilinear section, portions of the harness 14 disposed in these curvilinear sections may not be properly enveloped during injection molding without these sub-cavities 30. The dimensions of the sub-cavities 30 may also be designed such that the corrugated covering 33 has a desired thickness.

The bottom half 18 of the mold 10 also includes leader pins 34 that may be inserted into corresponding holes 36 in the top half 38 of the mold 10 for alignment of the bottom half 18 with the top half 38. In the preferred form shown in FIGS. 1 and 2, the bottom half 18 includes four pins 34 positioned near the corners of the bottom mold half 18. The pins 34 are inserted into the holes 36 in the top half 38 to ensure proper alignment of the two mold halves 18 and 38 with one another during the injection molding process. Although pins 34 and holes 36 are used in the preferred embodiment for aligning the two mold halves 18 and 38 to one another, it should be evident that many other conventional types and shapes of alignment mechanisms, such as interlocking teeth, grooves, slots, channels, etc., may be used to align the mold halves 18 and 38 with one another.

The cavity 20 in the bottom half 18 is preferably shaped to allow the creation of a substantially two-dimensional intermediate form. As used in a preferred embodiment shown in FIGS. 1 and 2, the interior surface 22 of the bottom half 18 includes several raised portions 40 that are elevated above a lower portion 42. As should be evident, many alternative interior surface, cavity, and sub-cavity shapes are available for the bottom half 18 of the mold 10. For example, in an alternative form, the entire interior surface 22 of the bottom half 18 may be a flat lower portion 42 and may not include any raised portions 40. The interior surface 22 and cavity 20 preferably define a non-complex, relatively two-dimensional shape such that the mold 10 is relatively inexpensive to create, can be reused many times, and can be used to create a standardized, intermediate harness form that may be manipulated into any of a variety of complex three dimensional geometries.

The bottom half 18 of the mold also preferably includes a fill groove 44. During injection molding, the liquid components are injected into the mold 10 via the fill groove 44, which is in fluid communication with sub-cavities 30 of the mold 10. The mixture of liquid components flows from the fill groove 44 to the sub-cavities 30 where they subsequently envelop the wire harness 14 and, as discussed further below, cure to form a rigid protective covering about the harness 14.

Figure 3:
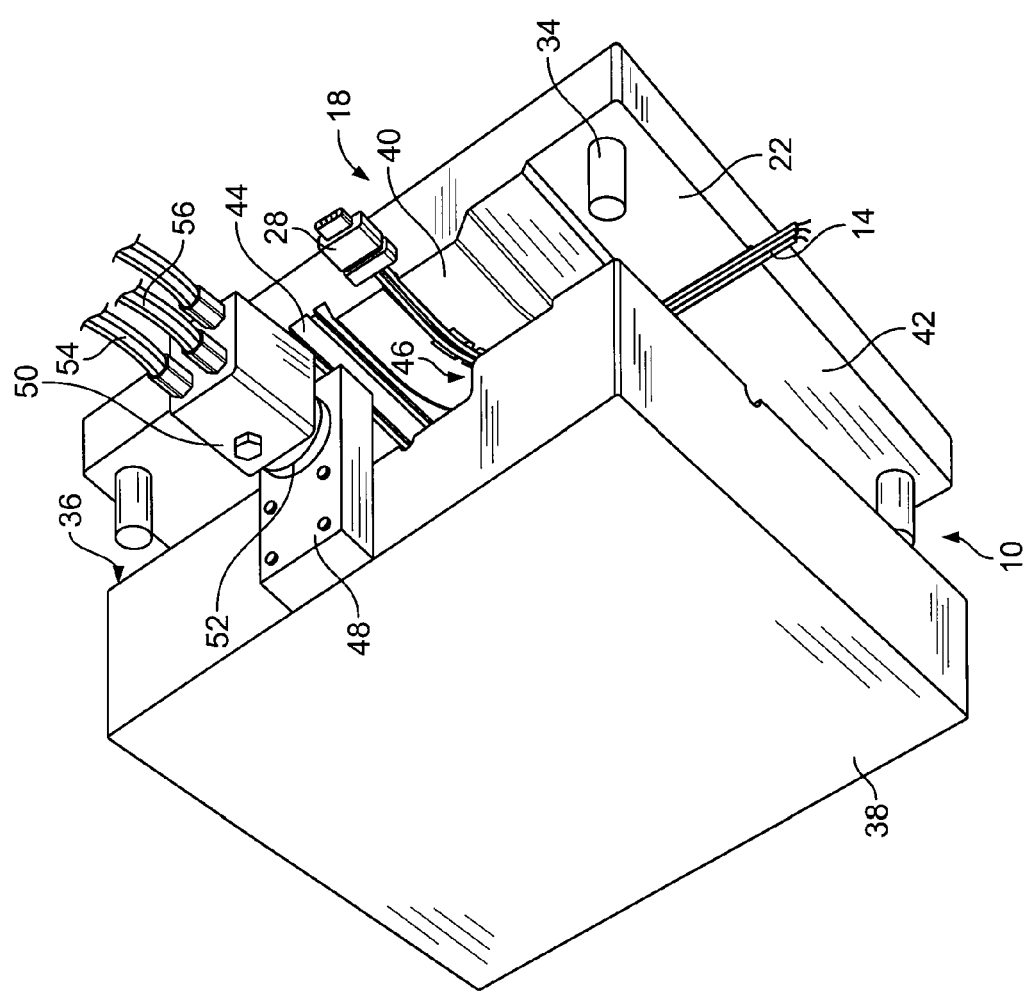
FIG. 3 is a perspective view of a top half of a mold and the wire harness and the bottom half of the mold of FIG. 1.

A preferred form of a top half 38 of the mold 10 is shown in FIG. 3. It preferably includes indentations 46 corresponding to the raised portions 40 of the bottom half 18 and for disposition of the harness 14. It may also include sub-cavities, similar to those described with respect to the bottom half 18 of the mold 10. The top half 38 also preferably includes a mounting portion 48 for mounting and connecting the top half 38 to a mixing head 50 of an injection molding system. During operation, as described further below, the mixing head 50 dispenses an injection molding fluid through a port 50 and through the fill groove 44 of the mold 10.

As should be evident, any of a variety of molds 10 with top and bottom halves 18 and 38 defining various shapes of cavities 20 and indentations 46 can be used. The top and bottom halves are generally two portions that sealingly engage one another to form the mold 10. The interior surfaces of the top and bottom halves 18 and 38 generally define inverse surfaces with respect to one another. In one preferred form, one half contains sub-cavities 30 that are filled with liquid during the injection molding process, while the other half does not contain sub-cavities. In alternative forms, both halves may have sub-cavities 30 that are filled during the injection molding process. Further, in other alternative forms, the mold 10 may be composed of more than two mold halves and may use "actions." It is preferable that the mold 10 used is relatively inexpensive and re-usable because, as described below, it is used herein to create an intermediate partially-cured harness form, not the final fully-cured geometric form.

Initially, as shown in FIG. 2, the wire harness 14 and electronic connectors 26 and 28 are positioned in and about the bottom half 18 of the mold 10. Next, as shown in FIG. 3, the top half 38 of the mold 10 is positioned so as to engage the bottom half 18 and to enclose the harness 14 and electronic connectors 26 and 28 within and about the mold 10. The leader pins 34 of the bottom half 18 are inserted into the corresponding leader pin holes 36 in the top half 38 for proper alignment of the top and bottom halves 18 and 38. The top half 38 and bottom half 18 are preferably maintained in sealing engagement with one another to prevent the escape of injection molding fluid from the mold 10. An injection molding press preferably applies a clamping force to keep the mold halves 18 and 38 sealingly engaged during the injection molding process.

Once the harness 14 and electronic connectors 26 and 28 are enclosed within and about the mold 10, they are preferably subjected to a reaction injection mold (RIM) process. More specifically, two liquid components, preferably a polyol and an isocyanate, are preferably dispensed from respective feed tanks at a predetermined rate through supply lines 54 and 56 to the mixing head 50. The delivery of the components to the mixing head 50 is synchronized, or metered, to ensure a uniform chemical reaction. The liquid reactants are thoroughly mixed in the mixing head 50 by high velocity collision of the reactants under high pressure. From the mixing head 50, the liquid polyurethane mixture is injected through a port 50 and into the mold fill groove 44 at relatively low pressure. The liquid mixture undergoes an exothermic reaction in the mold 10 to form the polyurethane polymer.

The proportions of polyol and isocyanate may be formulated such that the polyurethane polymer is formed within a range of stiffnesses when fully cured. They may be formulated to form either a flexible foam or a rigid solid. Here, it is generally contemplated that the proportions of polyol and isocyanate are preferably formulated such that the polyurethane forms a rigid solid when fully cured. It is also contemplated, however, that the teachings described herein may be applied to provide a three-dimensional geometric form for foams or flexible solids.

Further, although it is generally contemplated that polyurethane is formed as the protective covering, other materials may be used, such as other types of thermosetting plastics. In general thermosetting plastics are polymers that irreversibly cure to form a strong material in which molecular bonds are cross-linked. Subsequent high temperature reheating of the cured material results in decomposition of the material before a melting point is reached, and accordingly, a thermoset material cannot be melted after it is cured. Generally, thermoset polymers are more durable than thermoplastic polymers because of this three-dimensional cross-linking of bonds and are well-suited to high temperature applications.

Accordingly, thermosetting polymers are generally preferred over other materials, such as thermoplastic polymers, because they are more conducive to the automotive and commercial vehicle environment. Thermosetting polymers do not melt in this heated environment, which may involve the spraying of hot oil and other liquids. In contrast, thermoplastics tend to melt at higher temperatures and they therefore generally provide a less desirable covering.

Although one reaction injection molding process has been described above, other such conventional processes may be used. Reaction injection molding is generally preferred because the low internal mold pressure associated with this type of molding allows the use of relatively inexpensive mold materials. Further, reaction injection molding is especially useful in the commercial vehicle industry to economically produce large and intricately-shaped parts. More specifically, the two liquid components are generally much less viscous than liquid thermoplastic polymer used in non-reaction injection molding techniques and less clamping force is required to hold the mold 10 together, which makes the production of large parts with complex geometry more economical. Although reaction injection molding is the preferred technique used herein, it should be evident that other conventional injection molding techniques may be employed.

Figure 4:
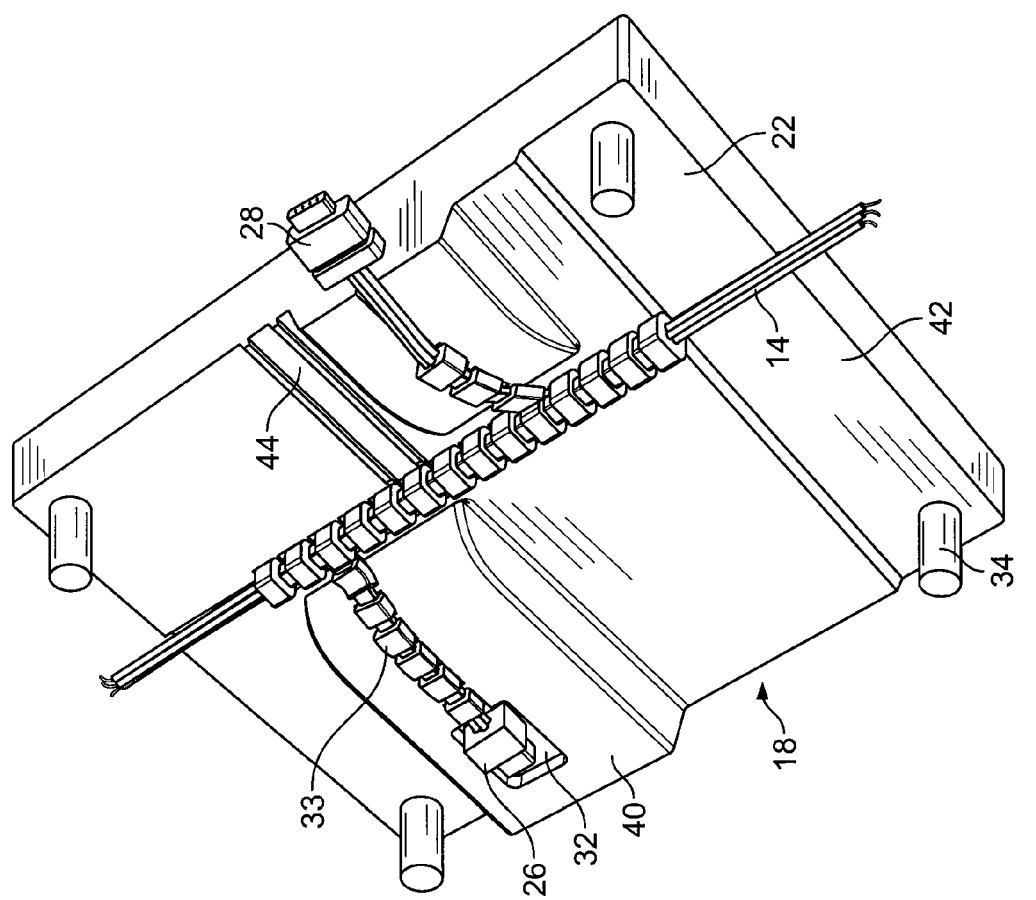
FIG. 4 is a perspective view of the wire harness disposed in the bottom half of the mold of FIG. 1 after injection molding.
Figure 5:
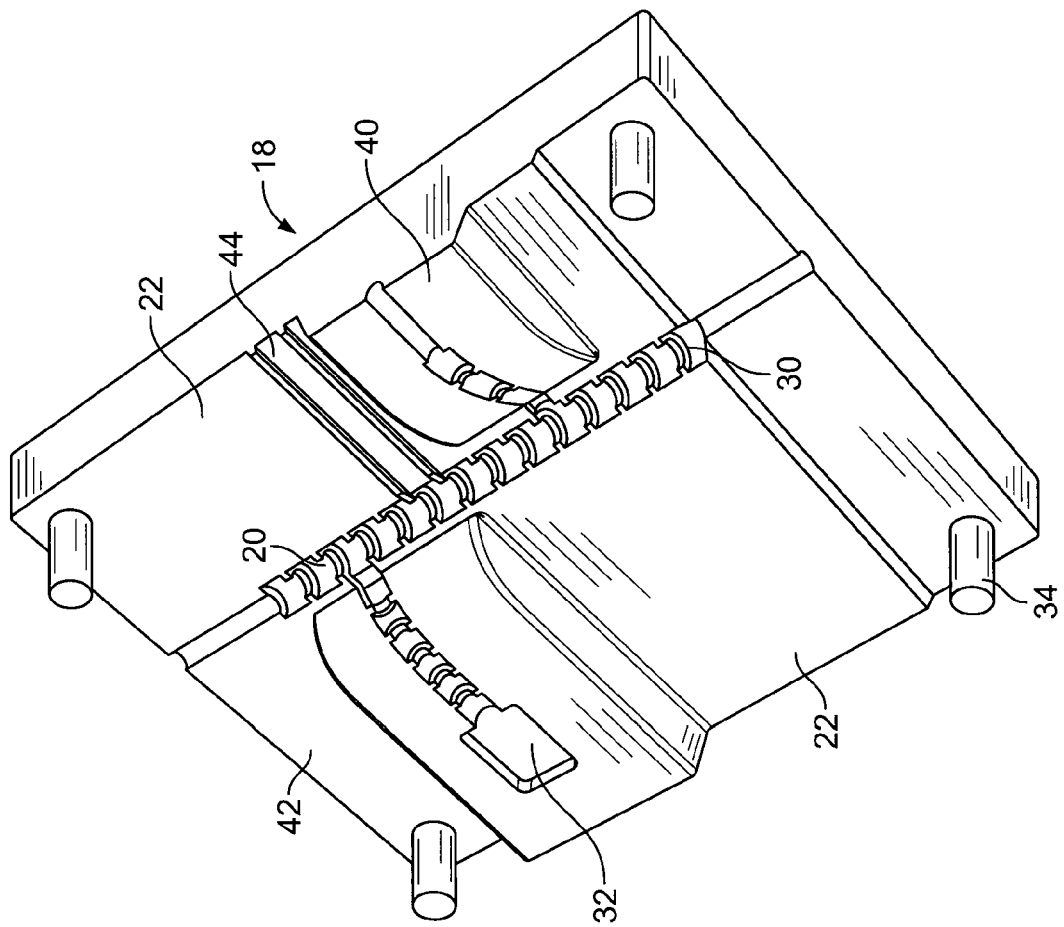
FIG. 5 is a perspective view of the overmolded wire harness and the bottom half of the mold of FIG. 4.
Figure 5:
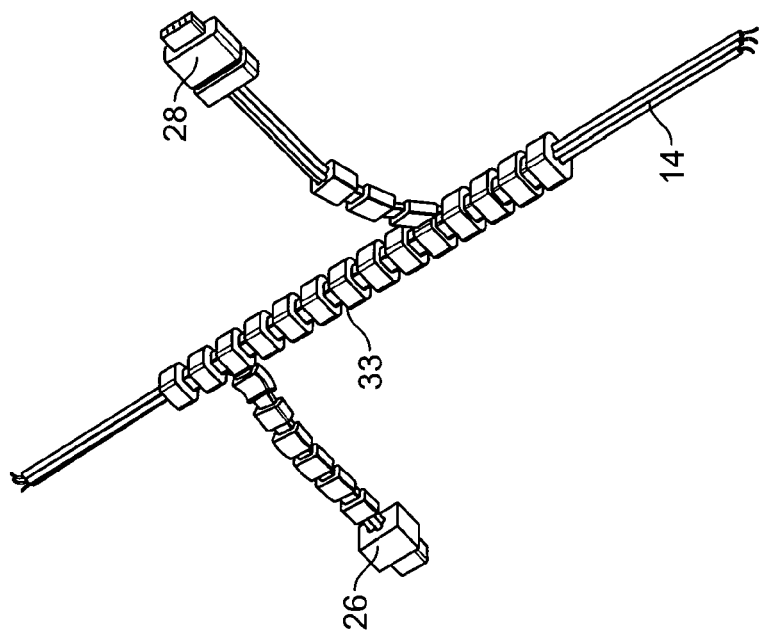

As shown in FIGS. 4 and 5, after injection molding is completed, the wire harness 14 is covered with polyurethane polymer at regions corresponding to the sub-cavities 30 of the mold 10. The top and bottom halves 18 and 38 of the mold 10 are disengaged to allow removal of the harness 14 from the mold 10. Immediately following injection molding, the harness covering 33 has been partially cured such that the harness 14 is generally ready for demolding within a few minutes after injection such that the harness 14 can be removed and handled without damage. The harness 14 may be demolded in accordance with any conventional method of demolding, such as through the use of ejector pins, air ejection, or stripper plates. In accordance with the preferred method, the polyurethane cures over a period of hours to form a rigid harness covering 33, and it must be removed from the mold 10 before it becomes inflexible and incapable of manipulation. As described further below, after the harness 14 is removed from the mold 10, it is manipulated into the desired final three-dimensional geometry before it becomes irreversibly cured.

The second phase of the method of the preferred embodiment involves the use of a post-molding fixture to create the desired three-dimensional geometry. Although most of the curing is generally accomplished within a few minutes after injection, i.e., on the order of 90% or 95%, the harness covering 33 is not fully cured. The remaining 5%-10%, or a similar percentage, of curing is accomplished over the next few hours, up to a maximum of about 36 hours. Manipulation of the harness covering 33 into its final three-dimensional form is accomplished during this time period before the covering 33 becomes fully cured. It is preferable, however, to position the harness 14 in the post-molding fixture 12 within about one hour of injection molding because, as more time passes between injection molding and insertion in the fixture 12, the harness covering 33 becomes incrementally harder to manipulate and does not hold the final desired shape as well after insertion into the fixture 12.

Figure 6:
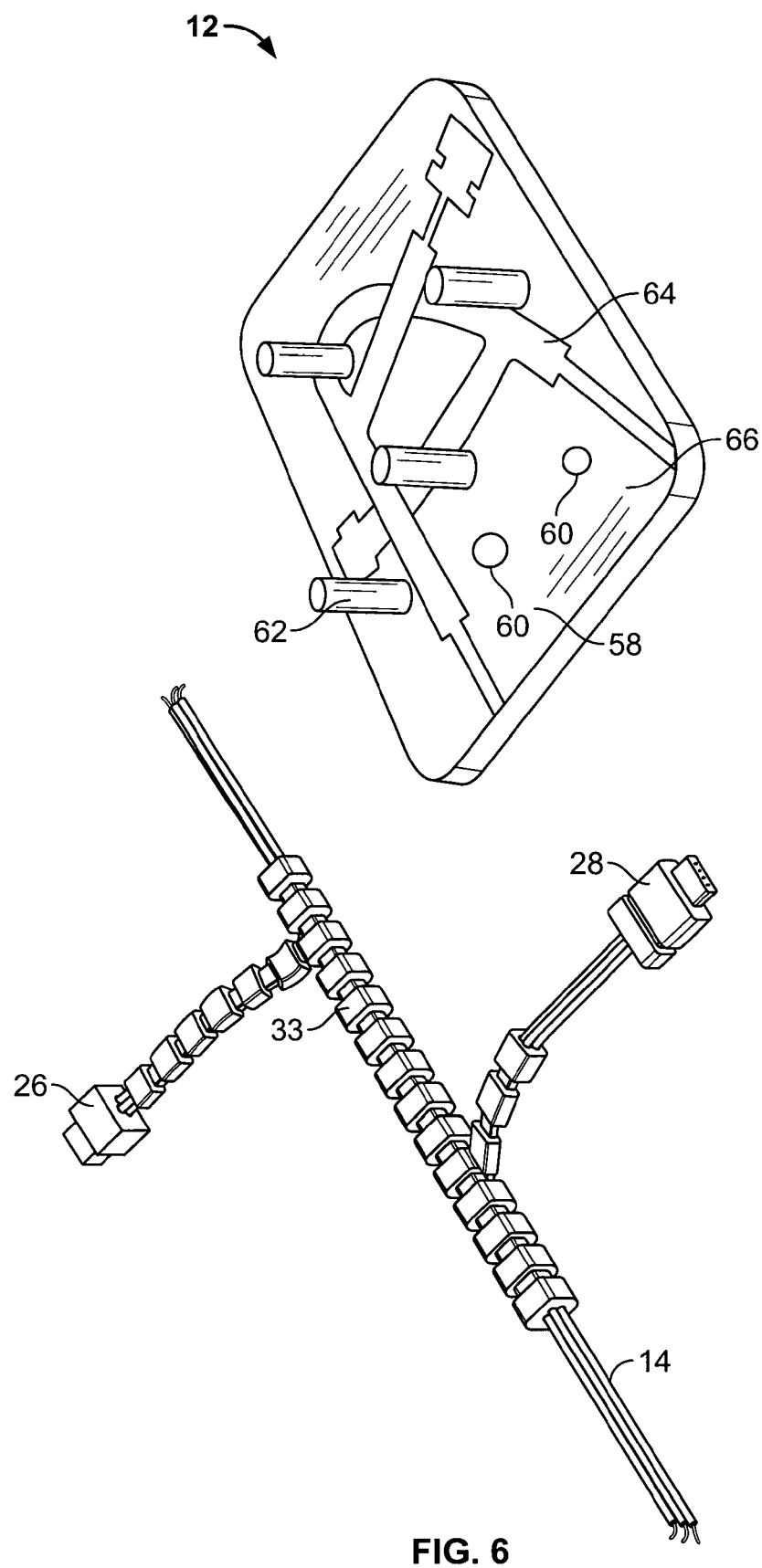
FIG. 6 is a perspective view of a post-molding fixture and the overmolded wire harness of FIG. 4.
Figure 7:
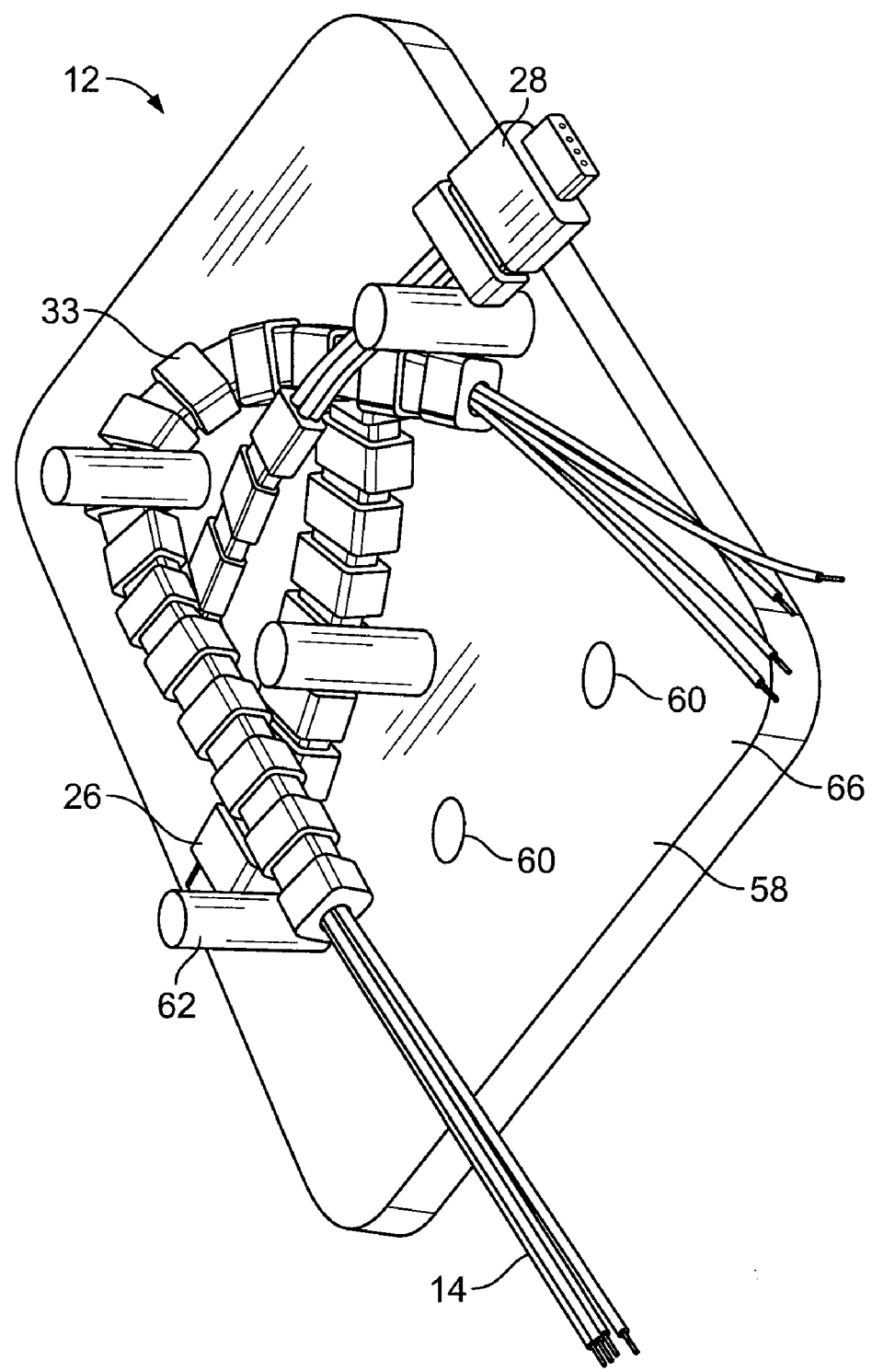
FIG. 7 is a perspective view of the overmolded wire harness disposed in the post-molding fixture of FIG. 6.
Figure 8:
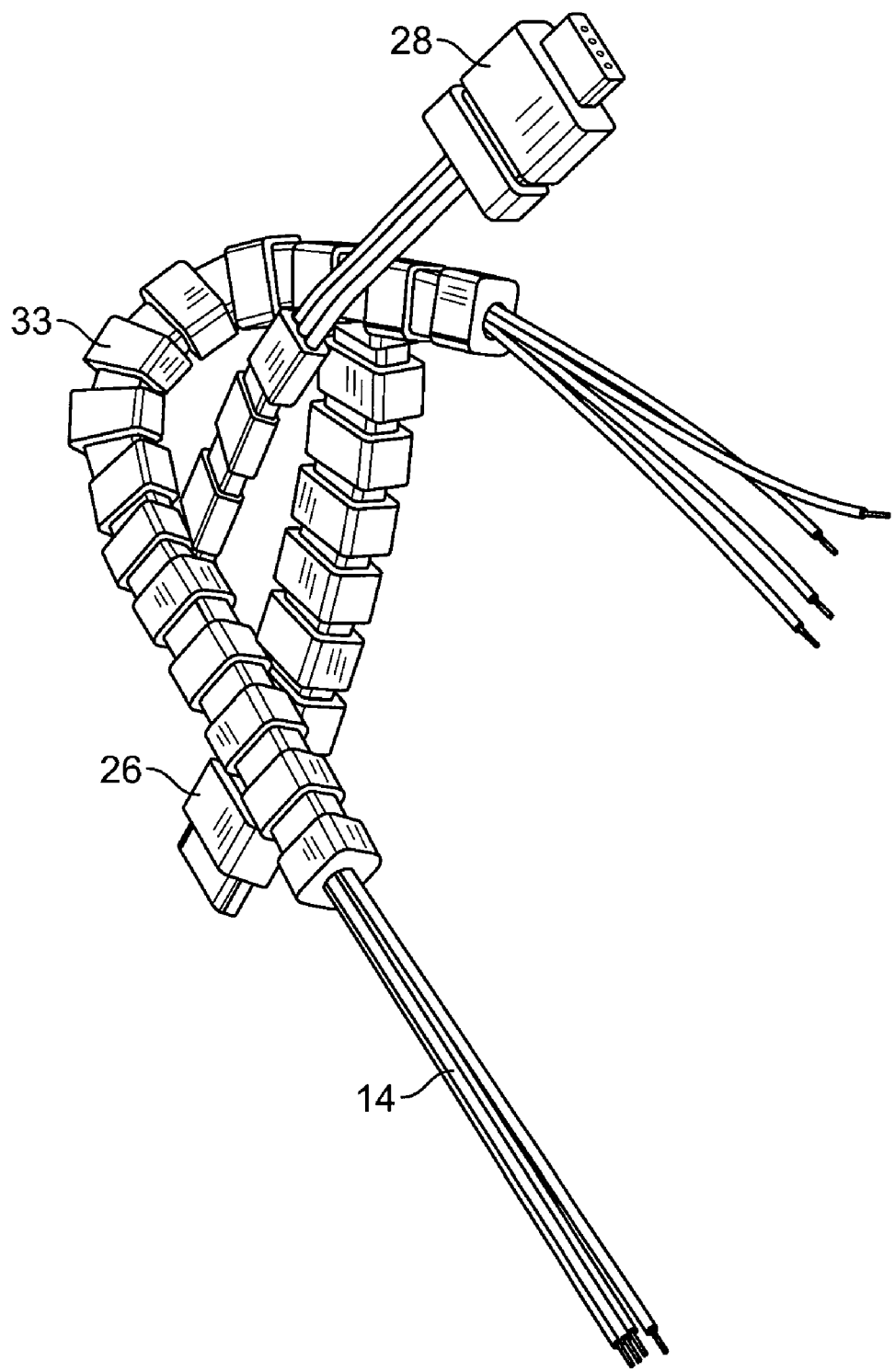
FIG. 8 is a perspective view of the overmolded wire harness shown in FIG. 7 disposed into a harness having a three-dimensional geometry.

As shown in FIGS. 6-8, after the harness 14 is demolded, a post-molding fixture 12 is used to perform the final geometry work. The post-molding fixture 12 may be created from any of various inexpensive materials, such as wood, paper, fiberglass, composites, cardboard, metal etc. The use of a relatively inexpensive post-molding fixture 12, in combination with the simple mold 10 described above, allows for a significant savings in tooling costs.

One preferred form of a post-molding fixture 12 that may be used is shown in FIGS. 6 and 7. The post-molding fixture 12 is a jig used for shaping wires, cables, harnesses, etc., and it operates to maintain the harness 14 in the desired three-dimensional orientation as the covering 33 fully cures into its rigid form. The jig is a template and guide that helps control the orientation of various arms of the harness 14 with respect to one another. The jig helps the operator to create the same harness geometry over and over again and may be repeatedly used to convert numerous harnesses having a two-dimensional intermediate geometry to their final three-dimensional form.

As shown in FIGS. 6 and 7, in one form, the jig 12 includes a substantially flat and sturdy base portion 58. With respect to the preferred embodiment used in the figures, the base portion 58 is substantially rectangular in cross-section but, as should be apparent, the base portion 58 may be any of various shapes. The base portion 58 also may be made of any various materials, such as plastic, wood, metal etc. The base portion 58 preferably includes a plurality of pin receiving holes 60 arranged in a predetermined orientation to allow the repeated insertion of guide pins 62 at different positions of the base portion 58, as described further below, such that the same jig 12 may be reused for different three-dimensional geometries.

As shown in FIG. 6, a pattern, or blueprint 64, may be drawn, marked, scratched, or otherwise imprinted on the top surface 66 of the base portion 58. Alternatively, a pattern may be created on a separate material such as paper, and affixed to the top of the base portion 58, or affixed to a surface underneath a transparent base. This pattern 64 is a two-dimensional representation of the harness 14 in its final form. It is intended as an aid to manipulating the harness 14 into the desired three-dimensional geometry. The pattern 64 shown in FIG. 6 allows the harness 14 to be manipulated from a substantially two-dimensional geometry, shown in FIGS. 5 and 6, to a three-dimensional geometry, shown in FIGS. 7 and 8.

In a preferred form shown in FIG. 6, the jig 12 includes guide pins 62 that are used to set the final three-dimensional geometry. The guide pins 62 are preferably inserted in the pin receiving holes 60 in the base portion 58 and are disposed at predetermined positions about the base portion 58 to properly orient various portions of the harness 14. The guide pins 62 are securely inserted or fixed to the base portion 58 to resist movement when the harness 14 is initially disposed in the jig 12.

In one preferred form, for example, the guide pins 62 may be pegs that can be removably inserted into receiving holes 60 in a board 58 having a regular or irregular grid of receiving holes 60. The receiving holes 60 may be oriented in accordance with a predetermined pattern and spacing such that the pegs 62 may be removably inserted into holes in the board 58 corresponding to the desired geometry. Alternatively, in another preferred form, pins or nails may be driven into a board at predetermined positions corresponding to the desired geometry. It should be evident that the guide pins 62 may be any of various shapes and materials and that, similarly, the base portion 58 of the post-molding fixture 12 may be any of various shapes and materials.

As discussed above, after injection molding and demolding, the harness 14 is in an intermediate, substantially two-dimensional form. The harness 14 is then preferably manipulated into its desired three-dimensional geometry and disposed in the post-molding fixture 12. As can be seen in FIGS. 7 and 8, the harness 14 has been bent about the guide pins 62 and contorted such that various portions of the harness 14 are spatially oriented above or beneath other portions. Depending on the size of the harness 14, the force required to contort the harness portions, and other considerations, the harness 14 may be manipulated manually by an individual either by hand or through the use of any convenient hand tools.

Figure 9:
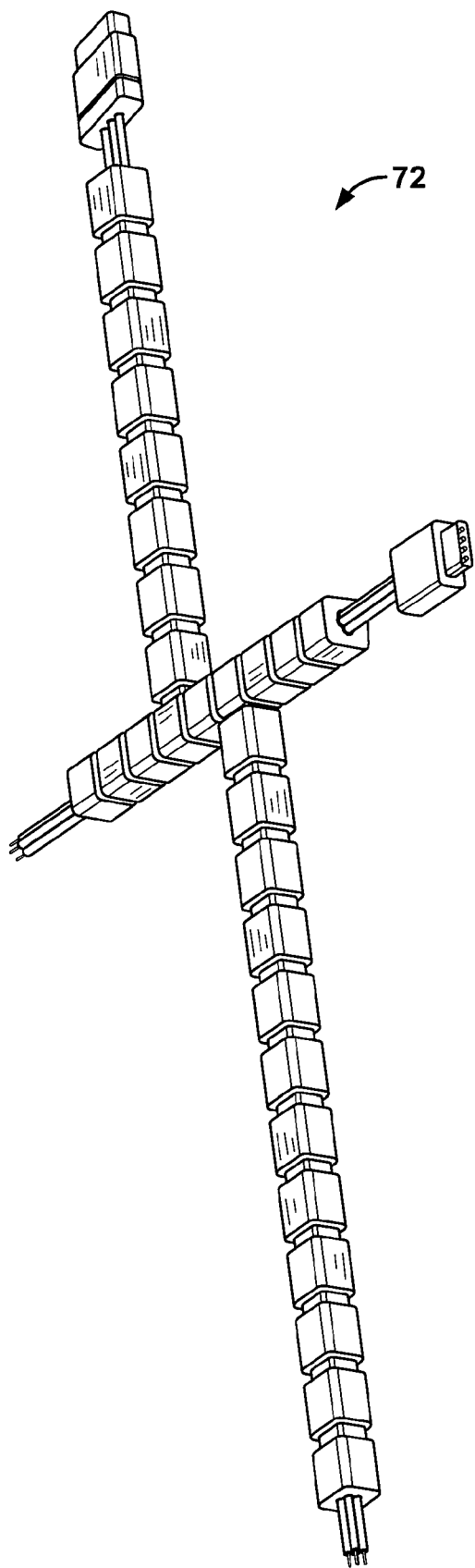
FIG. 9 is a perspective view of a second embodiment of an overmolded harness illustrating features of the present invention.
Figure 10:
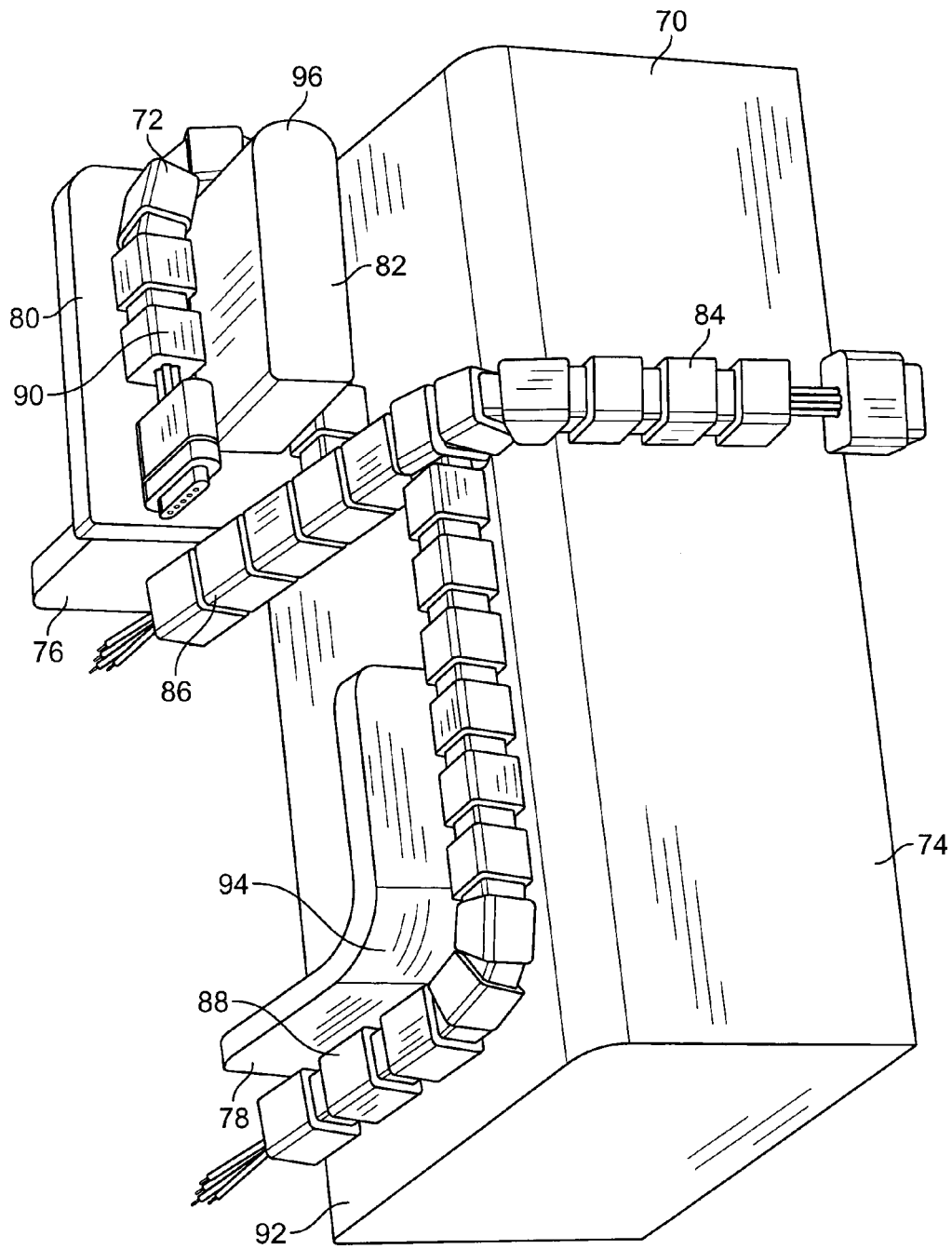
FIG. 10 is a perspective view of the overmolded harness of FIG. 9 disposed in a second embodiment of a post-molding fixture.
Figure 11:
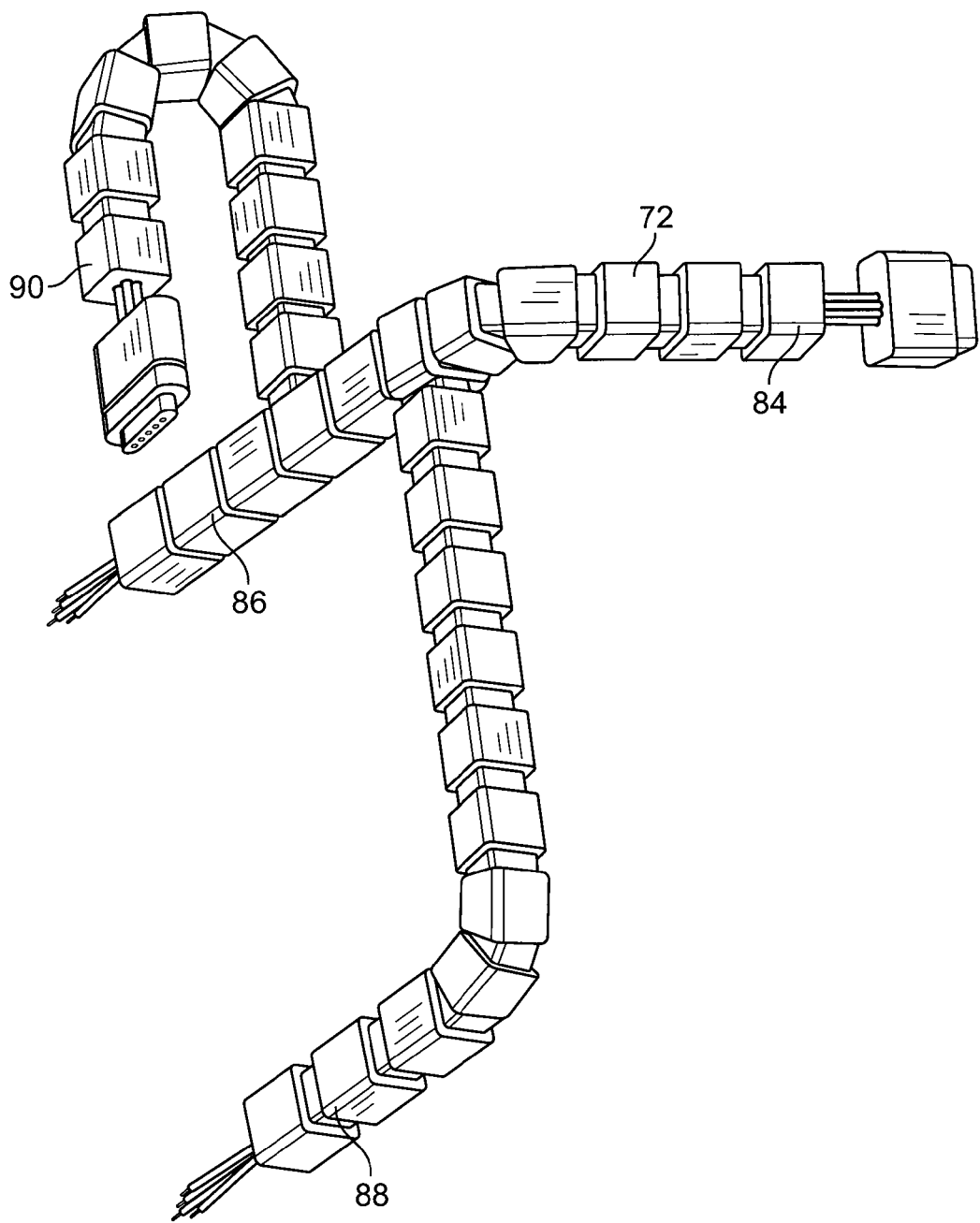
FIG. 11 is a perspective view of the overmolded harness of FIG. 9 after removal from the post-molding fixture of FIG. 10.

Another preferred form of the post-molding fixture 70 is shown in FIGS. 10-11. In this example, the fixture 70 is used to shape the overmolded harness 72 shown in FIG. 9. The overmolded harness 72 is flatter than the harness 14 described above. Various types of inexpensive molds may be used to form the intermediate stage overmolded harness with covering, but it is generally contemplated that the molds will be substantially two-dimensional to reduce mold tooling costs.

As shown in FIG. 10, the post-molding fixture 70 generally includes a base 74, walls 76, 78, and 80 extending from the base 74, and a tab 82 projecting from one of the walls 80. In this form, the base 74 is a brick-shaped, wooden block having a greater depth than the post-molding fixture 12 described above. This greater depth allows one of the arms 84 of the harness 72 to be extended downwardly in accordance with the predetermined three-dimensional geometry.

Three thin walls 76, 78, and 80 project upwardly from the top surface 92 of the base 74 to permit manipulation of the other three arms 86, 88, and 90 of the harness 72 into the predetermined geometry. One of the upstanding walls 76 is formed to allow one arm 86 to extend in a predetermined direction in the substantially two-dimensional plane of the overmolded harness 72. Another upstanding wall 78 forms a substantially 90 degree angle with a radiused corner 94 to orient another arm 88 to a desired curvilinear shape in the substantially two-dimensional plane. Further, in the form shown in FIG. 10, a tab 82 projects from the third upstanding wall 80 to orient the fourth arm 90 of the harness 72. The tab 82 has a predetermined height and a curvilinear end 96, which allows the fourth arm 90 to extend upwardly out of the substantially two-dimensional plane in a curvilinear manner.

Figure 12:
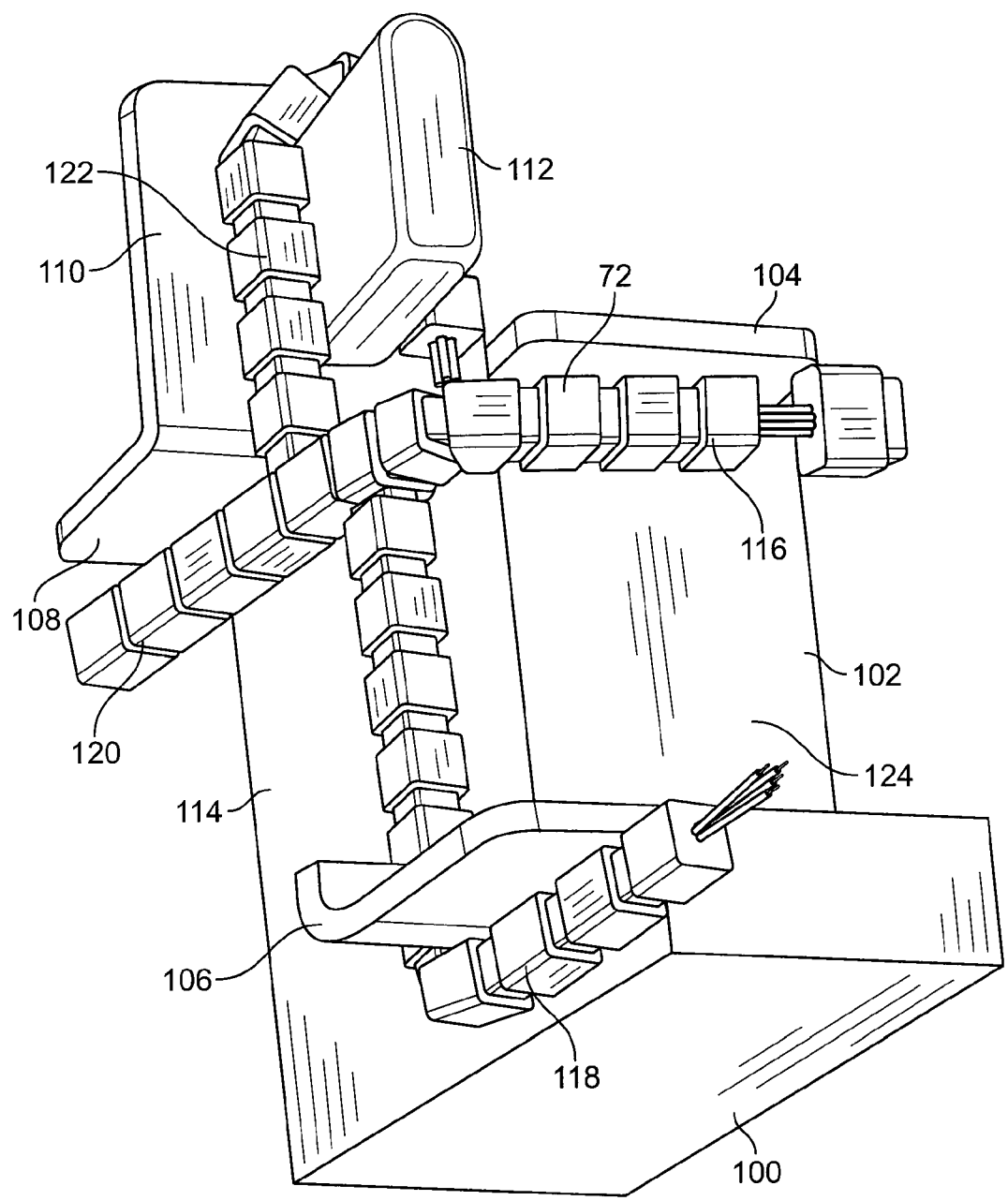
FIG. 12 is a perspective view of the overmolded harness of FIG. 9 disposed in a third embodiment of a post-molding fixture.
Figure 13:
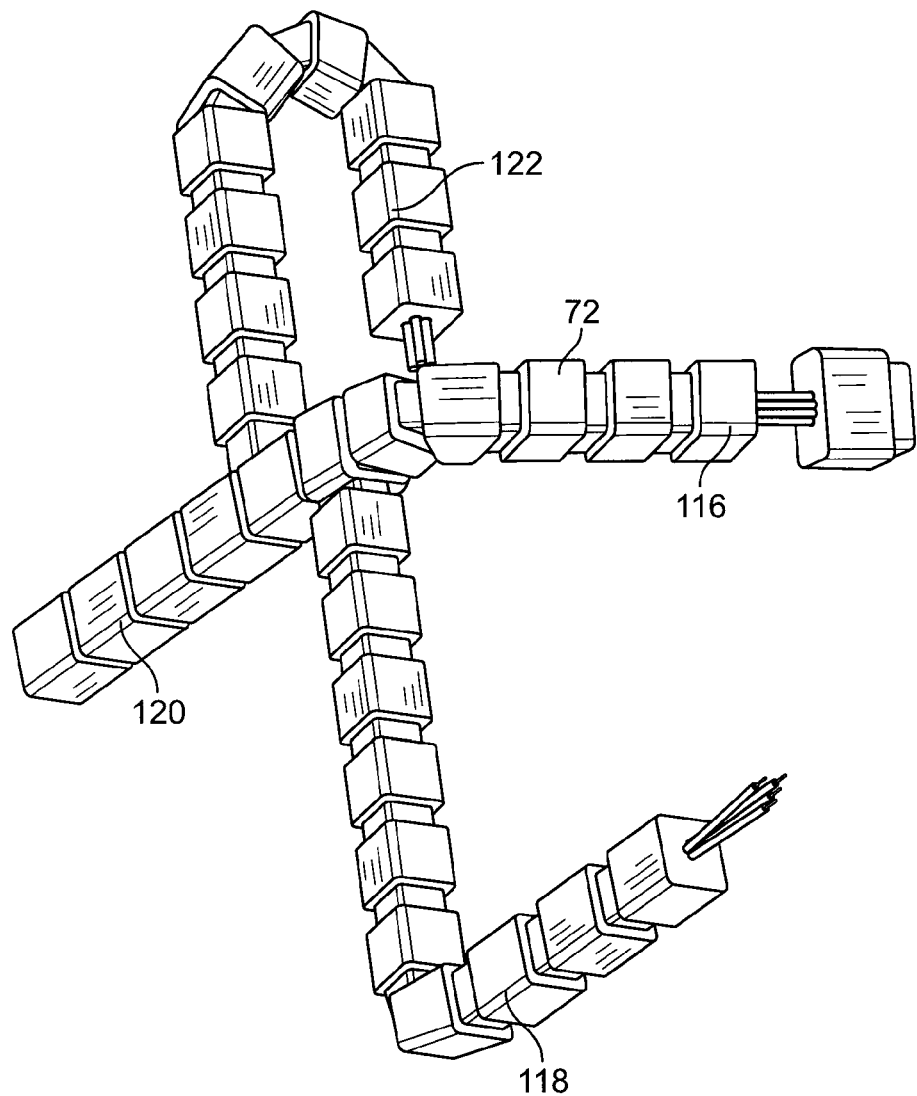
FIG. 13 is a perspective view of the overmolded harness of FIG. 9 after removal from the post-molding fixture of FIG. 12.

Another alternative preferred form of a post-molding fixture 100 is shown in FIGS. 12-13. The fixture 100 includes a base 102, walls 104, 106, 108, and 110, and a tab 112. In this form, the base 102 is wooden but is more irregularly shaped than the previously-described embodiment with several side surfaces. The base 102 has a wall 104 extending from one side surface 114 to orient one of the arms 116 downwardly. The base 102 also includes a curved wall 106 and two other walls 108 and 110 projecting upwardly from the top surface 114 of the base 102. These upstanding walls 106, 108, and 110 orient the other three arms 118, 120, and 122 of the overmolded harness 72 in a manner similar to that described above for the previous embodiment but fashioned to create a different predetermined three-dimensional geometry. For various preferred embodiments, the portions of the harness are preferably fastened to the post-molding fixture by straps, clamps, or other conventional fastening mechanisms to orient the harness in the desired configuration.

The above embodiments of the post-molding fixture 12 may be incorporated, in whole or in part, as part of a shipping container. This capability illustrates another advantage of certain preferred forms of the post-molding fixture 12. After the harness 14 has been positioned within the post-molding fixture 12, it is not necessary that it be removed within any specific time period, and it therefore may be left within the fixture 12 until after shipping to a desired location. Accordingly, the fixture 12 may be fashioned so that it may be easily and conveniently integrated into or function as a shipping container.

Figure 14:
FIG. 14 is a perspective view of a fourth embodiment of a post-molding fixture.

Other types of post-molding fixtures 12 may also be used. In an alternative preferred form, if the desired final geometry is relatively simple, one or more ties 130 (FIG. 14) may be fastened about various portions of the harness to achieve the final geometry. For example, if it is desired to simply convert a substantially two-dimensional linear harness to a substantially two-dimensional curvilinear harness, it may be sufficient to use a single wire tie 130 having ends 132 and 134 fastened together to hold two portions of the harness in the predetermined curvilinear orientation until the harness is fully cured. The tie 130 may be any of various thin strips of material used for fastening and may be made of any of various suitable materials, such as wire, string, rubber, or the like. One or more ties 130 may also be used in conjunction with preferred forms of post-molding fixtures 12, 70, and 100 described above to achieve the final predetermined geometry.

Accordingly, preferred embodiments have been described herein for a method and system for forming a wire harness covering according to a predetermined three-dimensional geometry. The method generally includes the steps of providing an injection mold that is substantially flat in shape and that defines a cavity therein; positioning a wire harness within the cavity of the mold; introducing an injection molding liquid into the cavity of the mold to form a covering about the wire harness; removing the wire harness from the mold before the covering is fully cured; providing a post-molding fixture corresponding to the desired predetermined three-dimensional geometry for the wire harness with covering; and positioning the wire harness with partially-cured covering within the post-molding fixture in accordance with the desired predetermined three-dimensional geometry. The system generally includes a wire harness; a substantially flat injection mold for forming a partially-cured wire harness covering having an intermediate, substantially two-dimensional shape; and a post-molding fixture including a base and guide members projecting from the base for orienting the partially-cured wire harness covering in accordance with the predetermined three-dimensional geometry.

The above described method and system for creating a complex three-dimensional harness are much less expensive than conventionally making this three-dimensional shape with complex molds. Conventionally, the design of the harness covering using complex molds has been limited by the ability to extract a complex part after it has been molded. Further, in order to create some of the complex three-dimensional shapes, complex three-part and four-part reaction injection molding tools have been required or the use of multiple tools has been required, resulting in a significant increase in tooling costs and investments. These disadvantages are not present with less complex flat molds, and the above method significantly reduces tooling costs by employing a simple, reusable substantially flat mold.

Cost savings arise primarily because the less complex flat molds can be tooled for a fraction of the cost involved for tooling the more complex molds that have been conventionally used. For certain molds, it has been estimated that the mold tooling costs may be reduced on the order of 50%. In other words, the cost for creating a substantially two-dimensional mold is about half that for creating a more complex, three-dimensional mold. In one specific example involving a mold made out of a composite aluminum filled epoxy, the estimated three-dimensional mold cost was about $75,000, while the estimated two-dimensional mold cost was about $40,000.

The above described method and system result in an inexpensive covering that provides additional advantages over other types of coverings. For example, as addressed above, it creates a covering that provides improved environmental performance; it does not melt at high temperatures, as are prevalent in automotive and commercial vehicle environments. In addition, the resulting covering has higher bundle density; lower space requirements, especially within the automotive or commercial vehicle environment; lower weight; a more pleasing aesthetic appearance; improved reliability and durability; the capability to easily integrate accessories, such as sensors and other electronic components; part-to-part consistency; and ease of installation for original equipment manufacturers (OEMs). Thus, the resulting covering provides improved performance over other materials, including, for example, circular plastic tubing made of thermoplastics that melts at high temperatures; metal sleeving that is relatively expensive; and braided asphaltic loom material that involves a messy fabrication process.

Further, although the method and system have been addressed with respect to automotive and commercial vehicle industries, it should be evident that the method and system are not limited to these industries. It is contemplated that the above described method and system may be used in other industries involving coverings for protecting conductors and other electric components and for interconnecting electrical systems and subsystems, especially where it is desirable to reduce the cost of the method. For example, it is contemplated that the above method and system might also be used in the aviation industry, with other types of vehicles, and for non-vehicle applications where it is desirable to create a protective wire harness covering.

The foregoing relates to preferred exemplary embodiments of the invention. It is understood that other embodiments and variants are possible which lie within the spirit and scope of the invention as set forth in the following claims.

What is claimed is:

1. A system that forms a wire harness covering according to a predetermined three-dimensional geometry, comprising:
    a wire harness;
    an injection mold that includes two mold halves that define a cavity therebetween and that is substantially flat in shape that forms a partially-cured wire harness covering having an intermediate, substantially two-dimensional shape; and
    a post-molding fixture that orients the partially-cured wire harness covering in accordance with the predetermined three-dimensional geometry,
    wherein the partially-cured wire harness covering is positioned in the post-molding fixture within a first predetermined time after forming the partially-cured wire harness covering, and
    wherein the cavity comprises sub-cavities that form a corrugated covering of a predetermined thickness for the wire harness.

2. The system of claim 1, wherein the post-molding fixture comprises a base with a plurality of guide members that project from the base that orients the wire harness in accordance with the predetermined three-dimensional geometry.

3. The system of claim 2, wherein the plurality of guide members are pins.

4. The system of claim 3, wherein the pins are disposed in pin receiving holes in the base.

5. The system of claim 4, wherein a subset of the pin receiving holes are arranged about the base according to a predetermined configuration.

6. The system of claim 2, wherein the guide members are walls.

7. The system of claim 6, wherein the base has a top surface and the walls are upstanding from the top surface.

8. The system of claim 6, wherein at least one of the walls has a tab protruding from the at least one wall.

9. The system of claim 1, wherein the post-molding fixture is made from one of wood, fiberglass, composite, metal, alloy, or cardboard.

10. The system of claim 1 wherein the post-molding fixture comprises a tie that engages two portions of the harness for holding the harness in a fixed position while the covering cures.

11. A system that forms a wire harness, comprising:
    a first mold portion and a second mold portion that define a cavity therebetween, each of the first mold portion and second mold portion is substantially flat in shape for forming a partially-cured wire harness covering having a substantially two-dimensional shape; and a post-molding fixture that orients the partially-cured wire harness covering in accordance with a predetermined three-dimensional geometry, wherein the post-molding fixture comprises a base with a plurality guide members that project from the base that orients the wire harness in accordance with the predetermined three-dimensional geometry.

12. The system of claim 11, wherein the cavity comprises sub-cavities that form a corrugated-like covering of a predetermined thickness that encapsulates the wire harness.

13. The system of claim 12, wherein a subset of the sub-cavities position the wire harness within each the first mold portion and the second mold portion.

14. The system of claim 11, further comprising a plurality of leader pins that facilitate alignment of the first mold portion with the second mold portion.

15. The system of claim 11, further comprising one of interlocking teeth, grooves, slots or channels that facilitate alignment of the first mold portion with the second mold portion.

16. A system of forming a three-dimensional wire harness, comprising:

a two piece mold that defines a cavity therebetween, wherein a combination of a polyol and an isocyanate facilitate a reaction injection molding (RIM) process to form a partially-cured wire harness covering having an intermediate shape;

a means for post-molding that orients the partially-cured wire harness covering from the intermediate shape into a predetermined three-dimensional configuration; and means for establishing a predetermined cure time based at least in part upon the molding process in view if thickness of the wire harness covering.

17. The system of claim 16, further comprising means for corrugating the wire harness covering.

18. The system of claim 16, wherein means for post-molding is a wood, fiberglass, composite, metal, alloy or cardboard fixture.

* * * * *